United States Patent [19]

Bang

[11] Patent Number: 5,568,333
[45] Date of Patent: Oct. 22, 1996

[54] ACTUATOR LATCHING DEVICE OF HARD DISK DRIVE

[75] Inventor: Kug-Hyeon Bang, Seoul, Rep. of Korea

[73] Assignee: SamSung Electronics Co., Ltd., Suwon, Rep. of Korea

[21] Appl. No.: 482,400

[22] Filed: Jun. 7, 1995

[30] Foreign Application Priority Data

Jun. 20, 1994 [KR] Rep. of Korea ................. 13906/1994

[51] Int. Cl.$^6$ ....................................................... G11B 5/54
[52] U.S. Cl. ................................................................ 360/105
[58] Field of Search ............................................... 360/105

[56] References Cited

U.S. PATENT DOCUMENTS

| | | | |
|---|---|---|---|
| 4,989,108 | 1/1991 | Chang | 360/105 |
| 5,003,422 | 3/1991 | Sun et al. | 360/105 |
| 5,023,736 | 6/1991 | Kelsic et al. | 360/105 |
| 5,216,662 | 6/1993 | Stefansky et al. | 360/106 X |
| 5,231,556 | 7/1993 | Blanks | 360/105 |
| 5,303,101 | 4/1994 | Hatch et al. | 360/105 |
| 5,313,354 | 5/1994 | Sampietro et al. | 360/105 |
| 5,319,511 | 6/1994 | Lin | 36/105 |
| 5,343,346 | 8/1994 | Bleeke | 360/105 |
| 5,361,182 | 11/1994 | Sampietro et al. | 360/105 |
| 5,363,261 | 11/1994 | Eckberg et al. | 360/108 |
| 5,369,538 | 11/1994 | Moe et al. | 360/106 |
| 5,414,577 | 5/1995 | Arin et al. | 360/105 |
| 5,448,437 | 9/1995 | Katahara | 360/105 |

FOREIGN PATENT DOCUMENTS 4-67371  3/1990  Japan ................................. 360/105

*Primary Examiner*—John H. Wolff
*Attorney, Agent, or Firm*—Robert E. Bushnell, Esq.

[57] ABSTRACT

An actuator latching device in a hard disk drive maintains the actuator of the hard disk drive in a parking zone while the actuator is not in operation. The hard disk drive includes: a disk that rotates at a high speed via a spindle motor, an actuator rotatably installed upon a pivot to access the disk, head gimbals having a magnetic head installed at one end of the actuator, a bobbin installed on a bottom portion of the actuator, and a voice coil motor for driving the actuator. The actuator latching device of the hard disk drive includes: a latching member fixedly attached to the bobbin, and a latching unit fixed to a body base. The latching unit includes: a magnet for attaching to the latching member to maintain the actuator in the parking zone, and a solenoid coil for reducing the intensity of and reversing the direction of a magnetic field generated by the magnet.

20 Claims, 7 Drawing Sheets

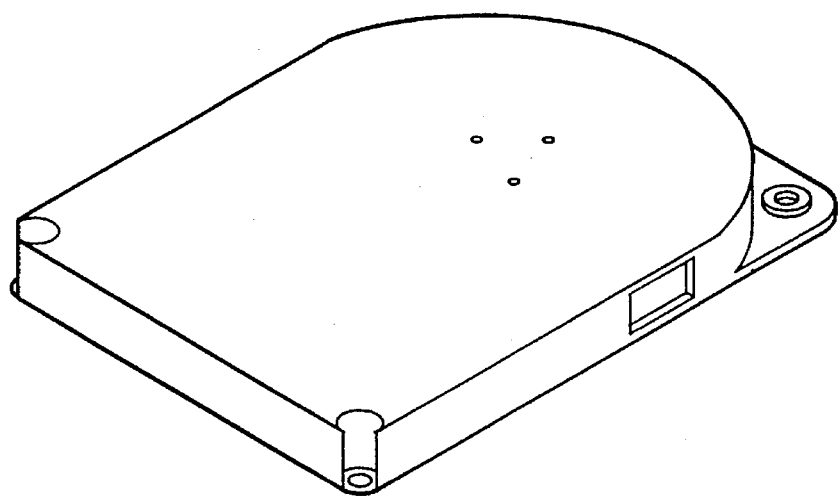
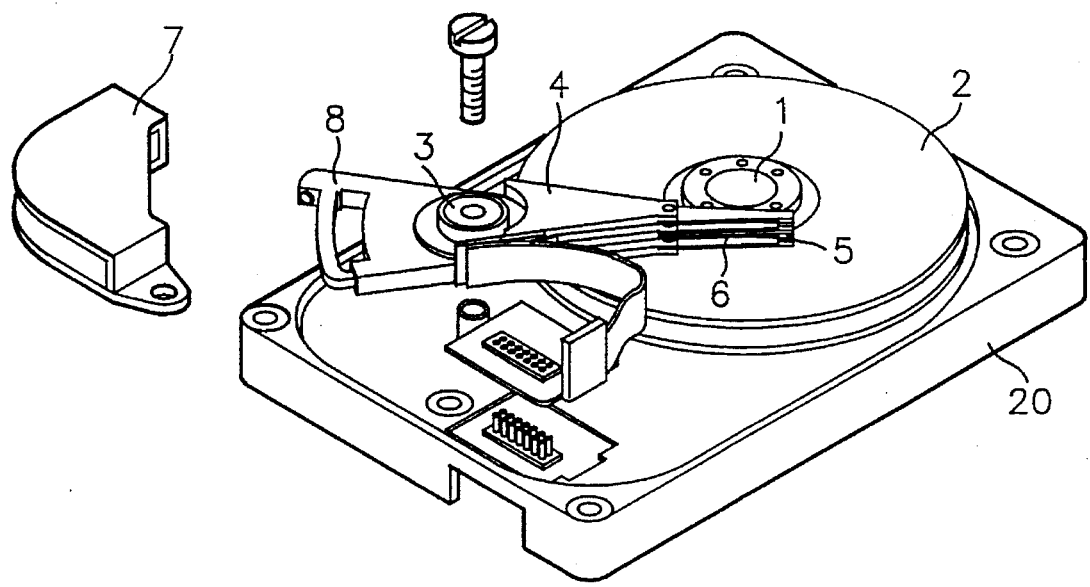
(CONVENTIONAL)
FIG. 1

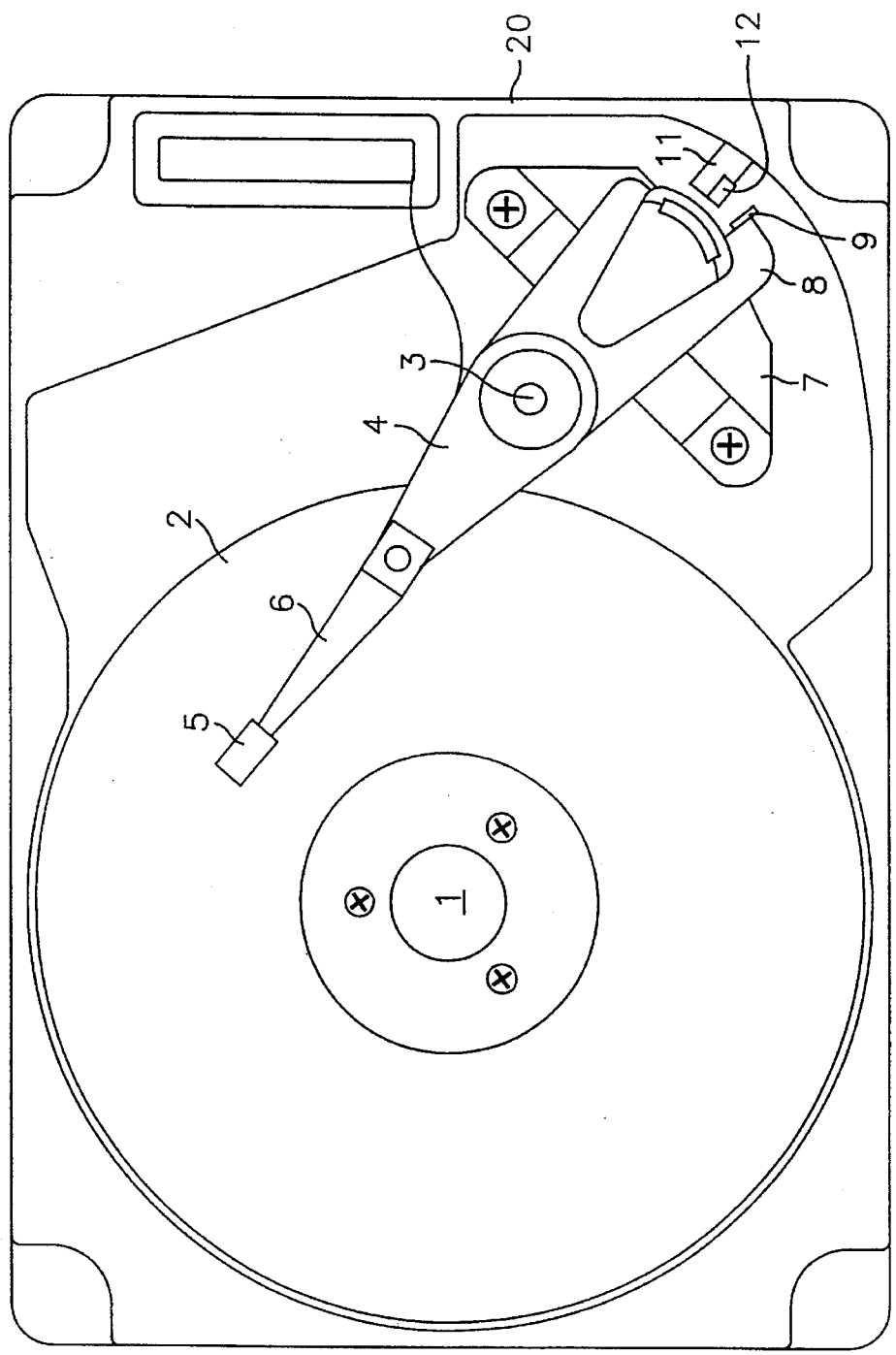
FIG. 2 (CONVENTIONAL)

ACTUATOR LATCHING DEVICE OF HARD DISK DRIVE

CROSS-REFERENCE TO RELATED APPLICATIONS

This application makes reference to, incorporates the same herein, and claims all benefits incurring under 35 U.S.C. §119 from an application for ACTUATOR LATCHING DEVICE OF HARD DISK DRIVE filed in the Korean Industrial Property Office on 20 Jun. 1994 and assigned Serial No. 13906/1994.

BACKGROUND OF THE INVENTION

The present invention relates to a hard disk drive, used as an auxiliary memory device in a computer, and more particularly, to an actuator latching device in a hard disk drive for maintaining an actuator in a parked position while the actuator is not in operation.

Generally, a hard disk drive used as an auxiliary memory device in a computer includes a disk which is rotated at a high speed by a spindle motor, and an actuator having a magnetic head for reading and writing data on tracks of the disk.

The actuator is rotatably installed upon a pivot. As a bobbin and coil provided at one end of the actuator move in response to operation of a voice coil motor, the magnetic head installed at the other end of the actuator moves across the surface of the disk, thereby reading data from and writing data onto the disk. The magnetic head, which is installed on a leading end of head gimbals, is displaced by an airflow generated between the magnetic head and a surface of the disk, and maintains a minute air gap between itself and the surface of the disk as the disk rotates at a high speed.

When the hard disk drive terminates operation, the actuator moves the magnetic head into a parking zone located on an inner portion of the disk. This is performed to prevent data recorded on the disk from being damaged due to undesired contact of the magnetic head with the surface of the disk.

Conventionally, hard disk drive manufacturers set a designated area on the disk where the magnetic head can be safely maintained. This area is often referred to as a parking zone, on which data is often not recorded, Or reading and writing is difficult. Typically, the parking zone is located on an inner portion of the disk. Methods for moving the actuator to the parking zone can be classified as both active and passive. A representative example of the former is a solenoid method, while an example of the latter is a magnetic latch method. The solenoid method is discussed in detail in U.S. Pat. No. 4,989,108, entitled *Electro-Mechanical Latch* issued to Chang on 29 Jan. 1991. This type of method has an advantage in that no significant biasing force is supplied to the actuator since the actuator latch, which operates as a mechanical pendulum-like latch, is released by applying an electrical current to the solenoid upon separation of the latch. This type of method, however, has a disadvantage in that a large number of devices for performing such functions (i.e. various mechanisms and circuits) are required, thereby occupying a large amount of space within the hard disk drive.

The magnetic latch method is disclosed in detail in U.S. Pat. No. 5,023,736, entitled *Magnetic Latch For Disk Drive Actuator* issued to Kelsic et al. on 11 Jun. 1991. The magnetic latch method has disadvantages in that the actuator is fixed by the force of a permanent magnet. With this type of method, a biasing force may be generated while the actuator searches for a track. Since the magnetic force is applied upon separation of the latch, the method exhibits problems in that the actuator performs unstable track searching operations. Also, upon movement of the actuator to the parking zone, the magnetic head may generate undesired noise.

SUMMARY OF THE INVENTION

Accordingly, it is an object of the present invention to provide an improved actuator latching device in a hard disk drive.

It is another object to provide an actuator latching device for securing a magnetic head in a parking zone on a disk while the actuator is not in operation, despite the presence of impacts and oscillations.

It is still another object to provide an actuator latching device that has no adverse effects on the servo-control function of the hard disk drive when the actuator operates to read and write data from and on the disk.

It is yet another object to provide an actuator latching device in which the actuator can be stably fixed by a magnetic force when not in use, and can be safely moved into a data zone by removing the magnetic force using an electrical current generated upon separation of the actuator from the latch.

It is still yet another object to provide an actuator latching device capable of removing a magnetic force by applying an electrical current to a coil to thereby prevent a biasing force from being generated when the actuator is in operation.

These and other objects may be obtained in accordance with the principles of the present invention with an actuator latching device in a hard disk drive. The device includes: a ferromagnetic latching member installed on one end of the actuator, and a latching unit. The latching unit includes: a magnet for attaching to the latching member to maintain the actuator in the parking zone, a solenoid coil for reducing the intensity of and reversing the direction of a magnetic field generated by the magnet, and a damper positioned at a rear portion of the magnet to reduce impacts.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 1 is a view illustrating the general construction of a hard disk drive;

FIG. 2 is a view illustrating an actuator and latching unit constructed according to conventional principles;

DETAILED DESCRIPTION OF THE PREFERRED EMBODIMENT

Figure 3A:
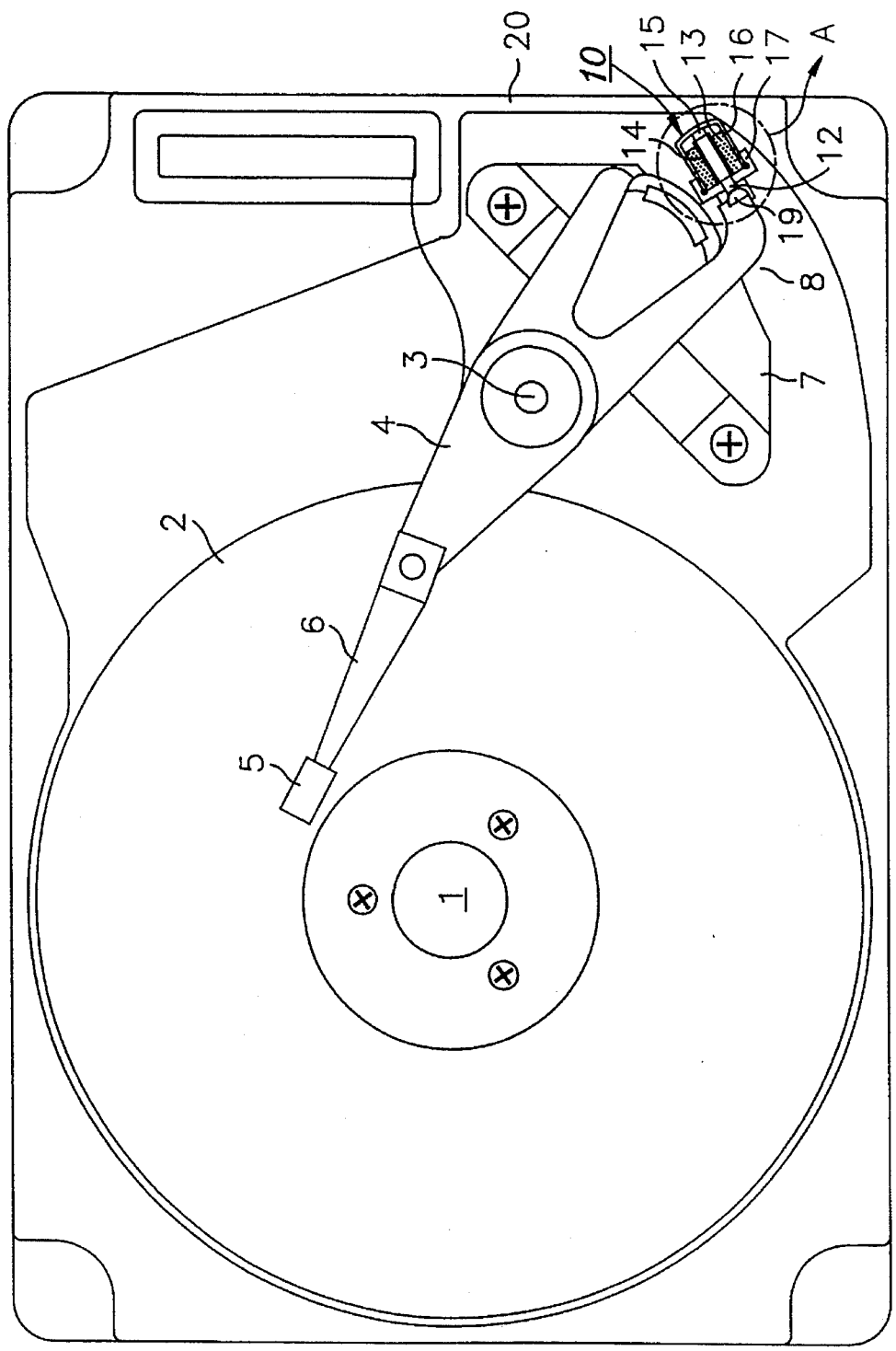
FIG. 3A is a view illustrating an actuator and latching unit constructed according to the principles of the present invention.

Referring to FIGS. 1 and 2, a general configuration of a hard disk drive, such as the one disclosed in Korean Patent application No. 93-9320 by the applicant of the present invention for performing the magnetic latch method, is illustrated. In FIGS. 1 and 2, a disk 2 rotates at a high speed by a spindle motor 1. Head gimbals 6, which have a magnetic head 5 positioned at one end for reading and writing data on the tracks of disk 2, are attached to an actuator 4. An automatic locking arm 9 composed of a conductive metallic material is installed at one end of actuator 4, while a middle portion of actuator 4 is pivotally installed upon a pivot 3 that extends upwardly from a body base 20. Also, an automatic locking magnet 12 having bipolar characteristics is mounted on a stopper 11 that is fixed to body base 20. When automatic locking arm 9 of actuator 4 approaches locking magnet 12 within a predetermined range, locking magnet 12 attracts automatic locking arm 9 and affixes actuator 4 in a locked position.

While reading and writing operations in the hard disk drive are performed, automatic locking arm 9 of actuator 4 is separated from automatic locking magnet 12 of stopper 11. However, when the hard disk drive is not in operation, or a parking command is issued, a bobbin 8 is moved via a magnetic force induced from a residual current in a voice coil motor 7 so that automatic locking arm 9 attaches to automatic locking magnet 12, thereby securing the parked position of actuator 4.

The conventional type of actuator fixing device described above has many disadvantages. First, since automatic locking arm 9 makes direct contact with automatic locking magnet 12 in order to lock actuator 4, kinetic energy from actuator 4 is often converted into undesired noise. Furthermore, during operation of ;actuator 4, if magnetic head 5 is positioned on the innermost track of disk 2, automatic locking magnet 12 attracts automatic locking arm 9 of actuator 4 by a magnetic force, thereby deteriorating a servo-control function of the hard disk drive and increasing the time required for read and write cycles. This can result in data errors occurring during reading and writing operations, due to the period of time required for the reading and writing operations being incremented.

Referring now to FIGS. 3A through 6, the actuator and latching unit constructed according to the principles of the present invention are shown. A disk 2 rotates: at a high speed by a spindle motor 1, and head gimbals 6 having a magnetic head 5 are installed at one end of an actuator 4. Actuator 4 is rotatably installed upon a pivot 3 to enable movement of magnetic head 5 across the surface of disk 2 as actuator 4 rotates. A voice coil motor 7 is installed adjacent to a bobbin 8 provided on a bottom portion of actuator 4. A latching member 19 composed of a ferromagnetic material and having a semi-circular shape is affixed to actuator 4, and a latching unit 10 is affixed to a body base 20. Latching unit 10 includes a cylindrical magnet 12 inserted within a solenoid coil 13. A sleeve-shaped tube 14 is positioned between magnet 12 and solenoid coil 13 to guide magnet 12, and a damper 15 for receiving and damping impacts is installed at a rear portion of magnet 12. Solenoid coil 13, which surrounds magnet 12, is covered with a capsule 16 composed of a ferromagnetic material. Capsule 16 is combined with a cover 17 molded from a plastic material. Accordingly, cover 17 of latching unit 10 is affixed to a body base 20 so that the electromagnetic field generated from magnet 12 is shielded, and has no effect on voice coil motor 7. As a result, latching member 19 of actuator 4 can be attached to magnet 12 of latching unit 10.

As stated above, latching member 19 of actuator 4 is composed of a ferromagnetic material, such as metallic steel. Cover 17 of latching unit 10, which includes a hole 18 in a central portion thereof, is installed to be affixed to body base 20 through hole 18 by a screw 21. Damping material 15 installed in latching unit 10 may be constructed from a resilient material such as rubber, a coil-shaped spring or a plate-shaped spring.

The operation and effects of the actuator latching device constructed according to the principles of the present invention will now be described. First, when magnetic head 5 of actuator 4 is positioned in the parking zone, since bobbin 8 is moved by an electrical force generated from voice coil motor 7, actuator 4 rotates about pivot 3 so that head gimbals 6 positioned opposite bobbin 8 are moved. Accordingly, magnetic head 5 is moved onto the tracks of disk 2 for reading and writing data.

Figure 5A:
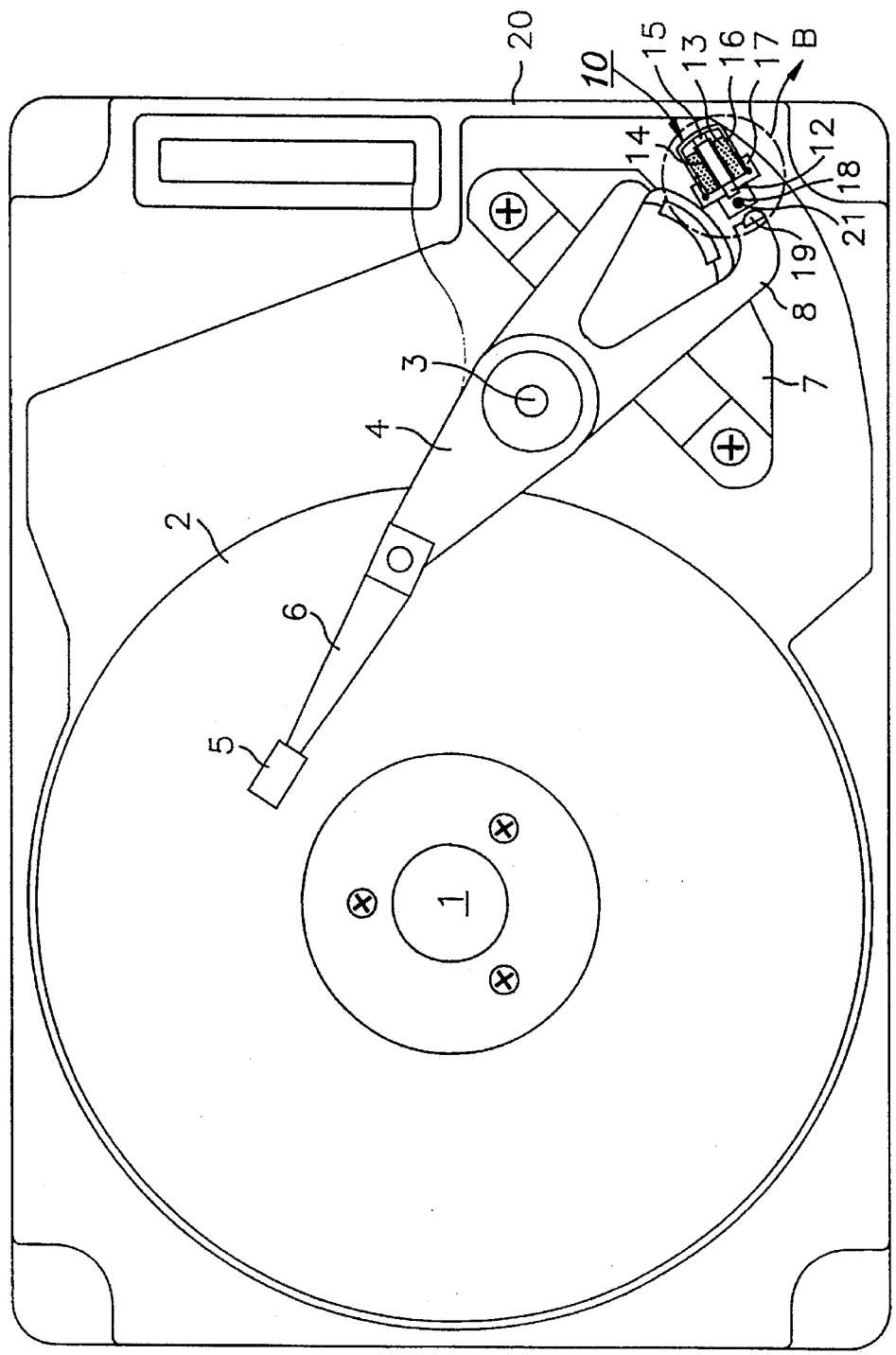
FIG. 5A is a view illustrating operation of the actuator and latching unit constructed according to the principles of the present invention.
Figure 5B:
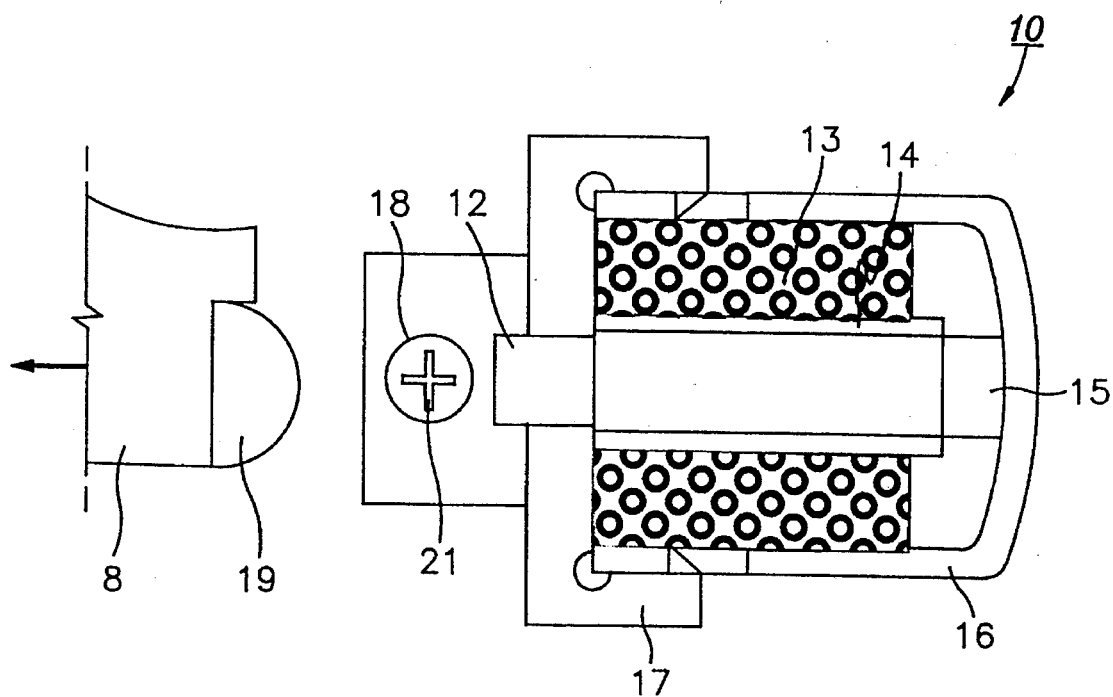
FIG. 5B is a detailed view of the region indicated by the circle "B" in FIG. 5A
Figure 6:
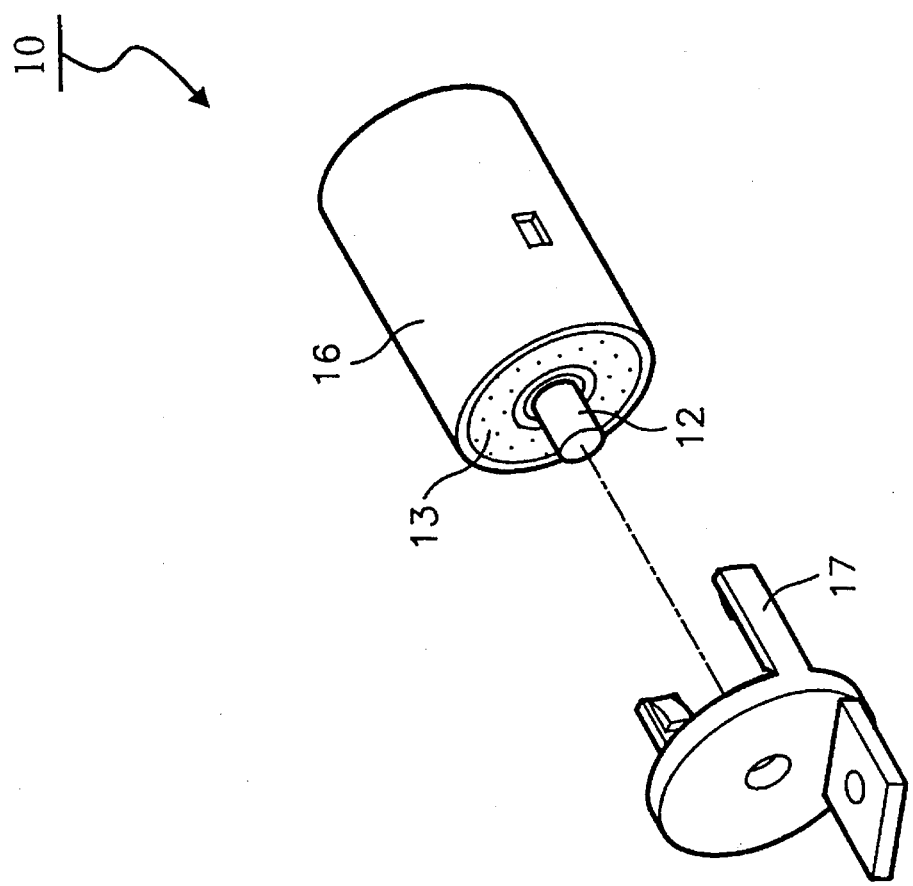
FIG. 6 is a perspective view of the latching unit constructed according to the principles of the present invention.

Then, when latching member 19 of metallic steel is in contact with magnet 12 of latching unit 10, an electrical current is applied to solenoid coil 13 at the moment magnetic head 5 moves onto a track where data is recorded so that a magnetic force is generated in a direction opposite to the magnetic force generated by magnet 12. At this time, as the attractive force of magnet 12 decreases at a leading end thereof, latching member 19 of actuator 4 is safely separated from magnet 12 by a driving force of voice coil motor 7. Actuator 4 then rotates about pivot 3 so that magnetic head 5 moves into the data zone on disk 2, as shown in FIG. 5A.

In the state described above, magnetic head 5 of actuator 4 can safely read and write data from and to the data zone on disk 2 without escaping from the track.

When magnetic head 5 is to be moved to the parking zone from the state described above, or when the operation of actuator 4 is interrupted due to a power failure, a residual current of voice coil motor 7 or a retraction current of spindle motor 1 induces an electromagnetic force that produces movement of bobbin 8 of actuator 4, so that magnetic head 5 moves towards the parking zone.

Figure 3B:
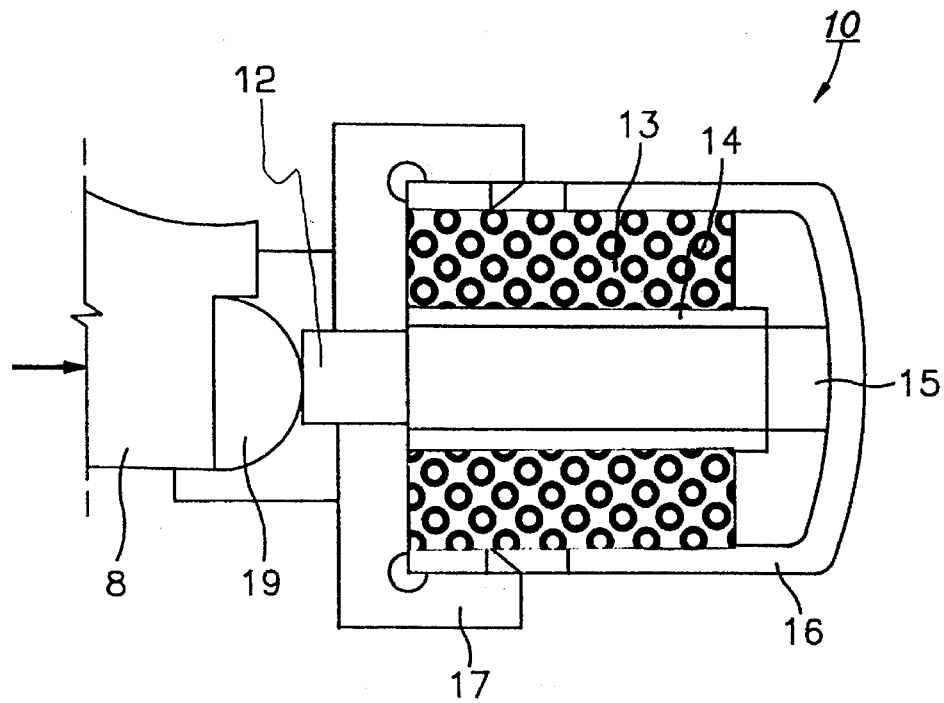
FIG. 3B is a detailed view of the region indicated by the circle "A" in FIG. 3A.
Figure 4:
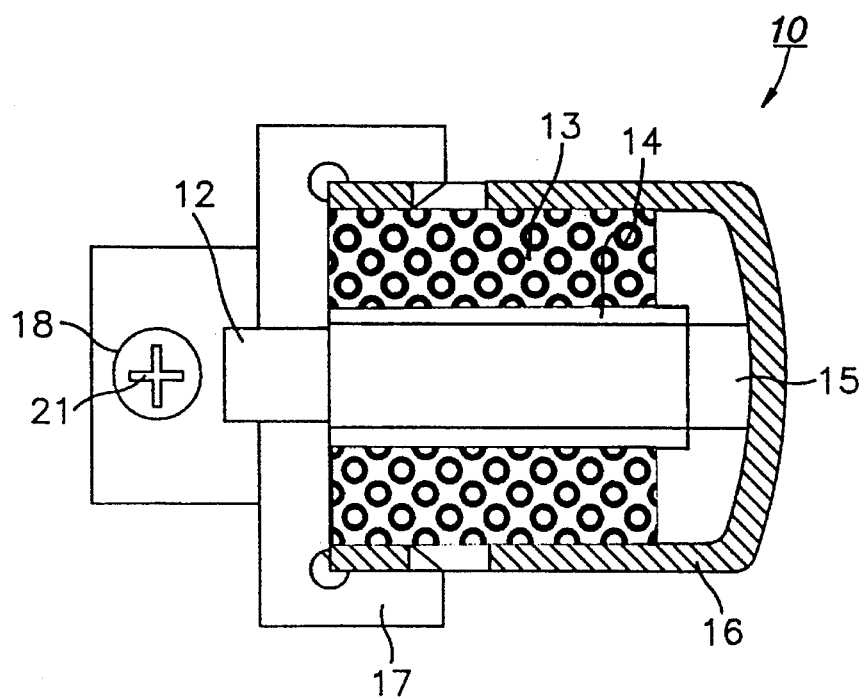
FIG. 4 is a view illustrating the latching unit constructed according to the principles of the present invention.

When the parking zone is reached, the arcuate portion of latching member 19 contacts the leading end of magnet 12 of latching unit 10 fixed to body base 20. At this time, in order to buffer the impact produced at the moment latching member 19 contacts magnet 12, magnet 12 is pushed towards damper 15 provided at the rear portion of magnet 12. Magnet 12 is guided by sleeve-shaped tube 14 and pushes damper 15 backwards. After the impact, damper 15 composed of a rubber or spring material is restored to an original state, and magnet 12 moves to its initial position. Accordingly, latching member 19 and magnet 12 are in contact with each other so that magnetic head 5 of actuator 4 is placed in the parking zone, as shown in FIGS. 3A and 3B.

In the state described above, since no electrical current is applied to solenoid coil 13 of latching unit 10, latching member 19 of actuator 4 is maintained in a fixed position by the magnetic force of magnet 12.

A magnet, preferably one composed from a rare-earth element (e.g., Sm—Co, Nd—B—Fe) is used as magnet 12, and the magnetic force is maintained from 100 gm—cm to 200 gm—cm so that actuator 4 will not move when not in operation. The magnetic field produced from this kind of magnet is not broad, and thus a strong biasing force is not applied upon actuator 4 during operation.

In order to protect the hard disk drive from external oscillations or impacts during operation, electrical current is applied to solenoid coil 13 to decrease the magnetic field generated from magnet 12, thereby reducing the biasing force applied to actuator 4. When magnetic head 5 of actuator 4 is positioned in the parking zone, an electrical current is not applied to solenoid coil 13, and therefore latching member 19 of actuator 4 remains in contact with magnet 12.

As discussed above, in a hard disk drive constructed according to the principles of the present invention, latching member 19 composed of metallic steel is attached to bobbin 8 positioned at one end of actuator 4. In latching unit 10, solenoid coil 13 is utilized to reverse the direction of the magnetic field generated by magnet 12 and damper 15 is installed at the rear portion of magnet 12. Latching unit 10 further includes Cover 17 surrounded with capsule 16. With the present invention, latching member 19 of actuator 4 attaches to latching unit 10 to maintain magnetic head 5 in the parking zone while actuator 4 is not in operation. Moreover, when magnetic head 5 reads and writes data on disk 2, the servo-control function of the hard disk drive can be easily implemented and the reliability of the hard disk drive can be improved.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best made contemplated for carrying out the present invention, but that the present invention includes all embodiments falling within the scope of the appended claims.

What is claimed is:

1. An actuator latching device in a hard disk drive including a disk rotated by a spindle motor, an actuator rotatably installed upon a pivot to access said disk, head gimbals having a magnetic head installed at a first end of said actuator, a bobbin installed on a bottom portion of said actuator, and a voice coil motor for driving said actuator, said actuator latching s device comprising:

a latching member having an arcuate portion extending from said bobbin;

a magnet, having first and second ends, for generating a magnetic field to engage and magnetically retain said arcuate portion of said latching member at said first end;

a solenoid coil, positioned to surround said magnet, for reversing a direction of said magnetic field generated by said magnet to release and separate said latching member from said magnet;

guiding means, positioned between said magnet and said solenoid coil, for guiding movement of said magnet; and damping means, positioned at said second end of said magnet, for buffering impacts received from said magnet when said magnet engages said latching member.

2. The actuator latching device of claim 1, wherein said guiding means comprises a sleeve-shaped tube positioned between said magnet and said solenoid coil.

3. The actuator latching device of claim 1, further comprising means for encapsulating said solenoid coil and shielding said magnetic field generated by said magnet from said voice coil motor of said hard disk drive.

4. The actuator latching device of claim 2, wherein said magnet has a cylindrical shape and is installed to be guided within said sleeve-shaped tube.

5. The actuator latching device of claim 2, wherein said damping means comprises one of a rubber material and a spring.

6. The actuator latching device of claim 1, wherein said latching member is comprised of a ferromagnetic material and said arcuate portion has a semi-circular shape.

7. A device for latching an actuator in a hard disk drive, said device comprising:

a latching member comprised of a ferromagnetic material, said latching member installed on first end of said actuator; and latching means affixed to a body base of said hard disk drive for attaching said latching member to prevent movement of said actuator, said latching means comprising:

a solenoid coil;

a magnet having first and second ends, said magnet positioned within said solenoid coil for contacting and magnetically retaining said latching member at said first end;

a sleeve-shaped tube positioned between said magnet and said solenoid coil to guide movement of said magnet;

damping means positioned at said second end of said magnet for damping an impact received from said magnet when said latching member contacts said first end of said magnet;

a ferromagnetic capsule for shielding a magnetic field generated by said magnet from a voice coil motor of said hard disk drive, said solenoid coil being positioned within said capsule; and a cover comprised of a plastic material and affixed to said body base for covering said latching means.

8. The device of claim 7, wherein said latching member is comprised of metallic steel and has a semi-circular shape.

9. The device of claim 7, wherein said cover has a hole formed in a central portion and is fixed to said body base by a screw passing through said hole into said body base.

10. The device of claim 7, wherein said damping means is comprised of one of a rubber material, a coil-spring and a plate-spring.

11. The device of claim 10, wherein said damping means is positioned between said ferromagnetic capsule and said second end of said magnet.

12. The device of claim 10, wherein said magnet has a cylindrical shape.

13. A device for latching an actuator in a hard disk drive, said device comprising:

latching means having an arcuate face installed on a first end of said actuator;

a solenoid coil;

a cylindrical magnet having first and second ends, said cylindrical magnet positioned within said solenoid coil for contacting and magnetically retaining said arcuate face of said latching means at said first end;

a sleeve-shaped tube positioned between said cylindrical magnet and said solenoid coil to guide movement of said cylindrical magnet;

damping means positioned at said second end of said cylindrical magnet for damping an impact received from said cylindrical magnet when said arcuate face of said latching means contacts said first end of said cylindrical magnet; and a capsule for encapsulating said solenoid coil and shielding a magnetic field generated by said magnet.

14. The device of claim 13, further comprised of said capsule being composed of a ferromagnetic material.

15. The device of claim 13, wherein said damping means is comprised of one of a rubber material, a coil-spring and a plate-spring.

16. A device for latching and unlatching an actuator in a hard disk drive, said device comprising:

a latching member having an arcuate portion extending outwardly from said actuator;

a magnet, having first and second ends, for generating a magnetic field to engage and magnetically retain said arcuate portion of said latching member at said first end;

a solenoid coil, positioned to surround said magnet, for reversing a direction of said magnetic field generated by said magnet to release and separate said arcuate portion of said latching member from said magnet when an electrical current is applied to said solenoid coil, and for enabling said magnet to engage and magnetically retain said arcuate portion of said latching member when said electrical current is not applied to said solenoid coil;

guiding means, positioned between said magnet and said solenoid coil, for guiding movement of said magnet; and damping means, positioned at said second end of said magnet, for buffering impacts received from said magnet when said magnet contacts said arcuate portion of said latching member.

17. The device of claim 16, wherein said guiding means comprises a sleeve-shaped tube positioned between said magnet and said solenoid coil.

18. The device of claim 17, wherein said magnet has a cylindrical shape and is installed to reciprocatingly travel within said sleeve-shaped tube.

19. The device of claim 16, wherein said damping means comprises one of a rubber material and a spring.

20. The device of claim 16, wherein said latching member is comprised of a ferromagnetic material and said arcuate portion has a semi-circular shape.

\* \* \* \* \*